(12) United States Patent
Lazaridis (10) Patent No.: US 8,295,822 B2
(45) Date of Patent: *Oct. 23, 2012

(54) SYSTEM AND METHOD FOR REDIRECTING COMMUNICATIONS FOR A MOBILE DEVICE

(75) Inventor: Mihal Lazaridis, Waterloo (CA)

(73) Assignee: Research In Motion Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/251,619

(22) Filed: Oct. 3, 2011

(65) Prior Publication Data

US 2012/0028621 A1 Feb. 2, 2012

Related U.S. Application Data

(63) Continuation of application No. 11/017,933, filed on Dec. 22, 2004, now Pat. No. 8,060,070.

(51) Int. Cl.
*H04M 3/42* (2006.01)
*H04M 1/00* (2006.01)

(52) U.S. Cl. ..................... 455/417; 455/550.1

(58) Field of Classification Search .............. 455/550.1, 455/417, 557, 412.1, 445, 435.1, 560, 47.1, 455/574; 370/356, 352

See application file for complete search history.

(56) References Cited

U.S. PATENT DOCUMENTS

| 6,078,826 | A * | 6/2000 | Croft et al. ................ 455/574 |
| 6,877,058 | B2 | 4/2005 | Sato et al. |
| 6,970,696 | B1 | 11/2005 | Fuoss et al. |
| 6,996,370 | B2 | 2/2006 | De Loye et al. |
| 2002/0029258 | A1 | 3/2002 | Mousseau et al. |
| 2002/0137498 | A1 | 9/2002 | Goss et al. |
| 2003/0092451 | A1 | 5/2003 | Holloway et al. |
| 2003/0181202 | A1 * | 9/2003 | Link et al. .................... 455/417 |
| 2004/0063464 | A1 | 4/2004 | Akram et al. |
| 2004/0157638 | A1 * | 8/2004 | Moran et al. ............... 455/550.1 |
| 2004/0185825 | A1 | 9/2004 | Preiss et al. |
| 2004/0192353 | A1 | 9/2004 | Mason et al. |
| 2007/0064918 | A1 | 3/2007 | Son |

FOREIGN PATENT DOCUMENTS

| EP | 1 054 571 | 11/2002 |
| EP | 1 395 066 | 3/2004 |
| GB | 2 371 717 | 7/2002 |

* cited by examiner

*Primary Examiner* — Kiet Doan (57) ABSTRACT

A method and system for automatically triggering call redirecting in response to a mobile device detecting its connection to a host such as a personal computer, is provided. In one embodiment, the mobile device detects connection by sensing application of a charging voltage via a Universal Serial Bus (USB) connection, and signaling the mobile device processor of the event. In response, the mobile device processor automatically decides to which alternative endpoint communications should be forwarded, and either instructs its transmitter to transmit a forwarding command to a network operations center or instructs the host to transmit the command through the Internet. The network operations center switch is operable to receive a call redirecting command respecting the mobile device from either the mobile device or the host to which the mobile device is connected, and adjusting its settings to effect call redirecting for subsequent communications for the mobile device.

20 Claims, 13 Drawing Sheets

| PREFERENCE | VALUE |
|---|---|
| AUTO REDIRECT | ON |
| MOBILE DEVICE REDIRECT | ON |
| ALT ADDRESS LOCAL | ON |

| HOST ID | ALT ADDRESS |
|---|---|
| HOST_HOME123 | (416) 595-1663 |
| HOST_WORK458 | (905) 595-6223 |
| HOST_SCHOOL789 | (416) 595-8899 |
| HOST_BATTCHARGER | (416) 595-1663 |

| TIME OF DAY | ALT ADDRESS |
|---|---|
| 6PM-8PM | (416) 595-1663 |
| 8PM-2AM | (416) 678-9123 |
| 2AM-8AM | (416) 595-1663 |
| 8AM-6PM | (905) 595-6223 |

| TELEPHONE NUMBER | DEVICE ID | ALTERNATE ENDPOINT IDENTIFIER | CALL REDIRECTING FLAG |
|---|---|---|---|
| (416) 595-1158 | MDID7311975 | (416) 595-1163 | Y |
| (416) 123-1150 | MDID0003971 | – | N |
| (416) 885-1985 | MDID0100011 | (416) 595-7979 | N |
| ⋮ | ⋮ | ⋮ | ⋮ |
| (416) 595-6823 | MDID7312004 | (416) 595-1228 | Y |

Fig. 10

SYSTEM AND METHOD FOR REDIRECTING COMMUNICATIONS FOR A MOBILE DEVICE

RELATED APPLICATION

This application is a continuation of application Ser. No. 11/017,933, filed Dec. 22, 2004, which is hereby incorporated by reference in its entirety.

FIELD OF THE INVENTION

The following is directed in general to mobile communications devices, and more particularly to a method and system for automatically instructing a network operations center in a mobile communications system to redirect communications for a mobile device.

BACKGROUND OF THE INVENTION

Mobile communications devices (mobile devices), such as wireless PDAs, cellular telephones and smart phones, are becoming increasingly popular for business use due in part to the tendency of today's worker to be out of the office while still being required to be in touch with colleagues, customers and clients. Mobile devices are also very popular for personal use as they enable a person to communicate with friends and family from nearly any location. The relatively recent increase in sophistication, decrease in cost and improvements in services and features supported by mobile communications infrastructures and devices have made such products and services increasingly attractive to users.

Communications features such as call redirecting (also known as "call forwarding") help make mobile devices really useful for users. Call redirecting enables a communication device user to command the device's network operations center to redirect communications for the communications device to an alternate communications endpoint. For instance, an email normally received wirelessly by the mobile device may be redirected to a desktop computer, or a telephone call normally received wirelessly by the mobile device may be redirected to a desktop telephone. To effect redirecting, using the mobile device a user manually initiates a wireless command to a call controller to redirect calls for the mobile device to an alternate communications device. A benefit accruing from mobile device call forwarding in particular is the option of a user employing a generally less-expensive "land-line" network to receive calls for the mobile device, while being accessible via the mobile device communications address. For instance, when a user reaches the office the user may want all incoming mobile device communications to be directed to their desktop telephone. Similarly, when the user gets home for the day, the user may want all incoming mobile communications to be directed to their home telephone. Furthermore, in anticipation of soon being outside a wireless service area, a user has the option of, for instance, continuing to receive calls by having the wireless network redirect calls through an alternate network to a land-line communications device in a location the user expects to be.

Most network operators offer call redirecting as an option to be activated on the user's account for a fee. In fact, call redirecting is well known in the industry as a method by which a user can deal with multiple phone numbers. However, a difficulty with the requirement of the user to manually activate and de-activate the service is that it is very easy for a user to forget to do so. That is, in a situation where redirecting would be advantageous to the user, a user must remember to inform the network operations center to redirect communications. A further difficulty with activation by wireless command is that, where wireless access is not available to a mobile device user, redirecting cannot be activated using the mobile device.

Cingular, a wireless provider headquartered in Atlanta, Ga., has offered battery chargers incorporating a feature named FastForward™ to address the problems due to mandatory manual activation of call forwarding. FastForward endows a battery charger with the intelligence to send a message to a mobile device to which it is connected, causing in turn the mobile device to send a wireless command to the network operations centre to redirect all calls to an alternate communications endpoint. Cingular's solution is useful in that it overcomes the requirement that call forwarding be activated manually. However, FastForward is a somewhat complex and costly logic component to add to the battery charger, and battery chargers incorporating the feature must be connected to a mobile device via both a serial data connection and a power connection. Normally, a user is not willing to spend large sums of money for a battery charger. Furthermore, Cingular's solution does not address the problem of being unable to trigger call forwarding while outside a wireless coverage area.

It is object of an aspect of the present invention to provide a method and system for triggering redirecting of calls for a mobile device that addresses at least the above-described deficiencies.

SUMMARY OF THE INVENTION

A method and system for triggering redirecting of calls for a mobile device is provided wherein the mobile device detects its connection to a host, and in response initiates transmission of a command to a network operations center to redirect communications for the mobile device to an alternate communications endpoint.

The method can be implemented entirely by the mobile device. Alternatively, the mobile device may instruct the host to transmit the command in certain situations such as when the mobile device is unable to gain access to a wireless network in order to transmit the command.

Provided also is a system in a network operations center that receives commands from a host to redirect calls for a mobile device to which the host has been connected to an alternate communications endpoint. Thus, such a network operations center may be operable to receive such commands from either the host or the mobile device.

As would be understood by one of ordinary skill in the art, the provision of automatic triggering of redirecting of calls enables a user to set up the feature once and let it activate itself in response to a user's action. Also, the benefit of having the mobile device initiate the call redirecting command in response to detecting the connection is that a battery charger need not do so (keeping its cost low), and special programs for communicating with a mobile device need not necessarily be installed. When required, the additional benefit of having the host transmit the command to the network operations center is that the feature can be activated when the phone is outside its wireless service area, or when non-wireless command transmission is most beneficial. Thus, the call redirecting feature may be used to its full advantage when actually needed.

These together with other aspects and advantages, which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

A detailed description of the preferred embodiment is set forth in detail below, with reference to the following drawings, in which.

DETAILED DESCRIPTION OF THE PREFERRED EMBODIMENT

Figure 1:
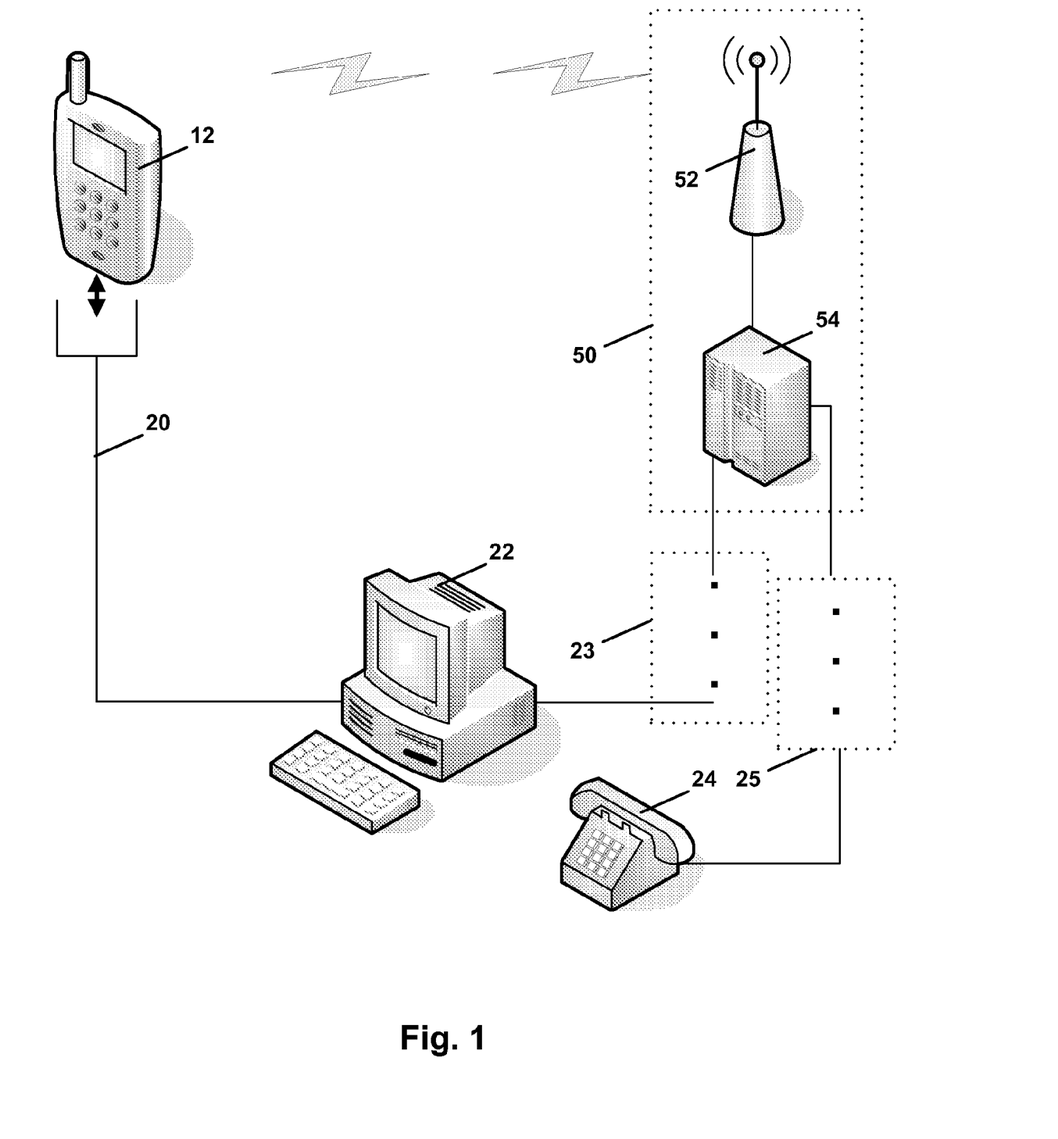
FIG. 1 is a block diagram of a typical communications system including a mobile device, a host and a network operations centre in which the methods and systems described herein may be implemented.

With reference to FIG. 1, a communications system 10 in which the invention may be implemented is shown. System 10 includes a mobile device 12 which under typical circumstances communicates voice and/or data using a wireless protocol with a network operations centre 50 via an antenna 52. Network operations centre also comprises a switch 54 connected to antenna 52 for coordinating directing of communications received for mobile device 12 and other such devices that are part of the network.

Mobile device 12 is connectable via an advanced USB (Universal Serial Bus) charging cable 20 to a host PC 22. Charging cable 20 is capable of transferring data between mobile device 12 and host PC 22 and, if required by mobile device 12, coincidentally transfer a charging current to mobile device 12 for maintaining its power supply's charge or for powering mobile device 12 while it is connected to host PC 22.

The USB specification was developed by a group of companies that were interested in developing a communication bus specification for connecting devices such as handheld mobile devices and personal computers. USB is now a pervasive standard for connecting mobile phones, devices, digital cameras and so forth to personal computers. One of the chief benefits to USB is its improved plug-and-play capability. Plug-and-play is a computer industry term used to describe functionality whereby devices, upon connection to a host, may immediately exchange data with the host. Some prior technologies required re-booting of the computer to which a new device was connected to have the computer execute a number of initialization routines in order to recognize such a device prior to data exchange. Other standards such as RS232 that are considered plug-and-play compatible are not as robust in the sense that detection of, and exchange of initial identification packets with, devices is not guaranteed. Furthermore, such standards cannot boast the data transfer speeds that USB offers. Another chief benefit of USB is that it is a bus structure, so that many devices can be daisy-chained off of very few USB connectors.

With USB, a user can connect a handheld device to a computer and immediately synchronize data such as telephone numbers, contacts, appointments, digital photographs and the like without re-booting the computer.

A USB device is connected to a host using a USB cable, which comprises a Vbus and GND wires for power transfer, and D+ and D− wires for data transfer. Through the Vbus and GND wires, power (at typically 5 volts) may be transmitted to a USB device in order to operate the device or re-charge its power supply. Through the D+ and D− wires, data can be transferred at one of several selected rates agreed upon during handshaking between the host and the device.

Further details of the USB specification can be found at the USB Implementers Forum (IF) website at http://www.usb.org.

Host PC 22 is connected to network operations centre switch 54 via data network 23. Connection and communication on data network 23 is made as is well known in the art using any suitable data network configuration and protocol, such as Ethernet TCP/IP (Transmission Control Protocol/Internet Protocol—the Internet) in combination with SMTP (Simple Mail Transfer Protocol—standard email).

An alternate telephone 24 is connected, via telephone network 25 to network operations centre switch 54. Connection and communication of telephone network 25 is made as is well known in the art using any suitable telecommunications network configuration and protocol, such as PSTN (Public Switched Telephone Network) or ISDN (Integrated Services Digital Network). Connection between telephone 24 and switch 54 may not be direct. It is more likely that these components are connected via a vast series of call controllers, switches etc. that are part of telephone network 25.

According to the illustrated embodiment of the invention, when mobile device 12 is connected via USB cable 20 to host PC 22, mobile device 12 detects the connection and initiates transmission of a command to network operations centre 50 to redirect calls for mobile device 12 to alternate communications endpoint 24. As will be described in more detail below, the command may be sent to network operations centre 50 by host PC 22 through data network 23 to switch 54 or by mobile device 12 wirelessly via network operations centre antenna 52.

Figure 2:
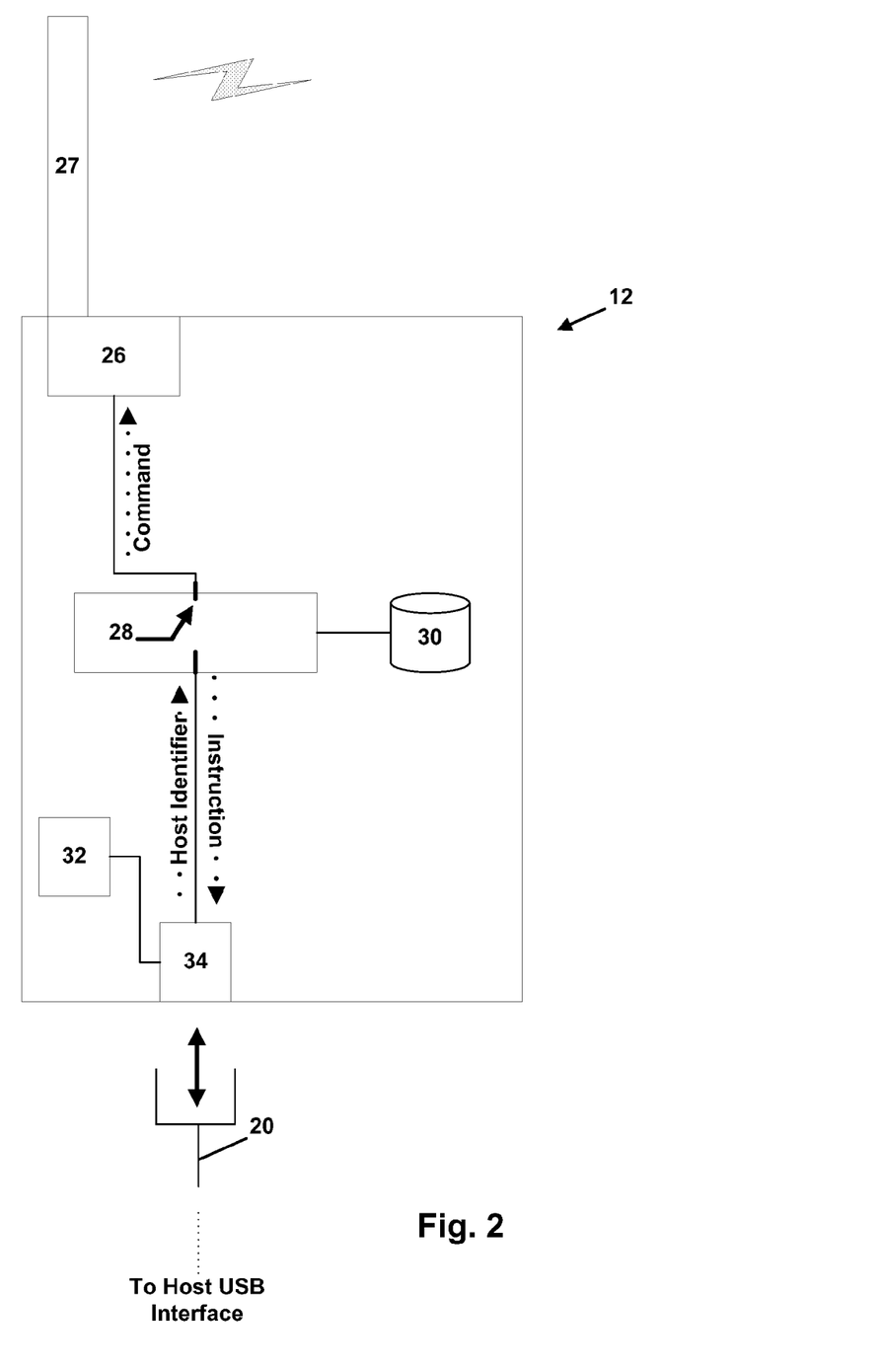
FIG. 2 is block diagram showing the features of the mobile device of FIG. 1 for triggering call redirecting.

The components for handling the foregoing in mobile device 12 are shown in further detail in FIG. 2. Wireless transceiver 26 is connected to antenna 27 and handles transmission and reception of wireless communications to and from network operations centre 50 via network operations centre antenna 52. Processor 28 handles coordination of the functions of mobile device 12. Processor 28 is connected via an internal data bus (shown only in part) in a known manner to wireless transceiver 26, device memory 30 and advanced USB interface 34. Power supply 32 is connected to the other components of mobile device 12 via a power bus, only the connection to USB interface 34 shown for the purposes described herein. Power supply 32 comprises batteries and supporting circuitry for handling power management and charging functions. Device memory 30 contains programs and data usable by processor 28 for operating and configuring mobile device 12.

USB interface 34 and processor 28 interchange signals regarding the coordination of data being received from host PC 22 and regarding the management of operation of USB interface 34. This interchange is done under the coordination of the programs in device memory 30. For instance, the receipt of data by USB interface 34 from host PC 22 is signaled to processor 28, and in response processor 28 can coordinate storage of the data in memory 30, or control other components of mobile device 12 on the basis of the data. Furthermore, when USB interface 34 is connected to a similar, counterpart USB interface in host PC 22 via advanced USB charging cable 20, USB interface 34 can detect a charging voltage applied by host PC 22 and in response signal processor 28 of the application of the charging voltage. As can be seen, such a signal is an indication to processor 28 that mobile device 12 is connected to host PC 22.

The USB specification is generally ideal for connection of mobile devices to host PCs because of its plug-and-play capability. That is, a host PC can recognize that a mobile device has been connected and start transferring data almost instantly, without having to go through the shut-down/re-start procedures as has been typical of parallel, serial connections etc. in the past. Plug-and-play capability is provided by the host PC operating system which is able to detect interrupts from the USB interface generated when the USB interface detects a to load device drivers into memory upon detection of a load at its USB interface.

Figure 2A:
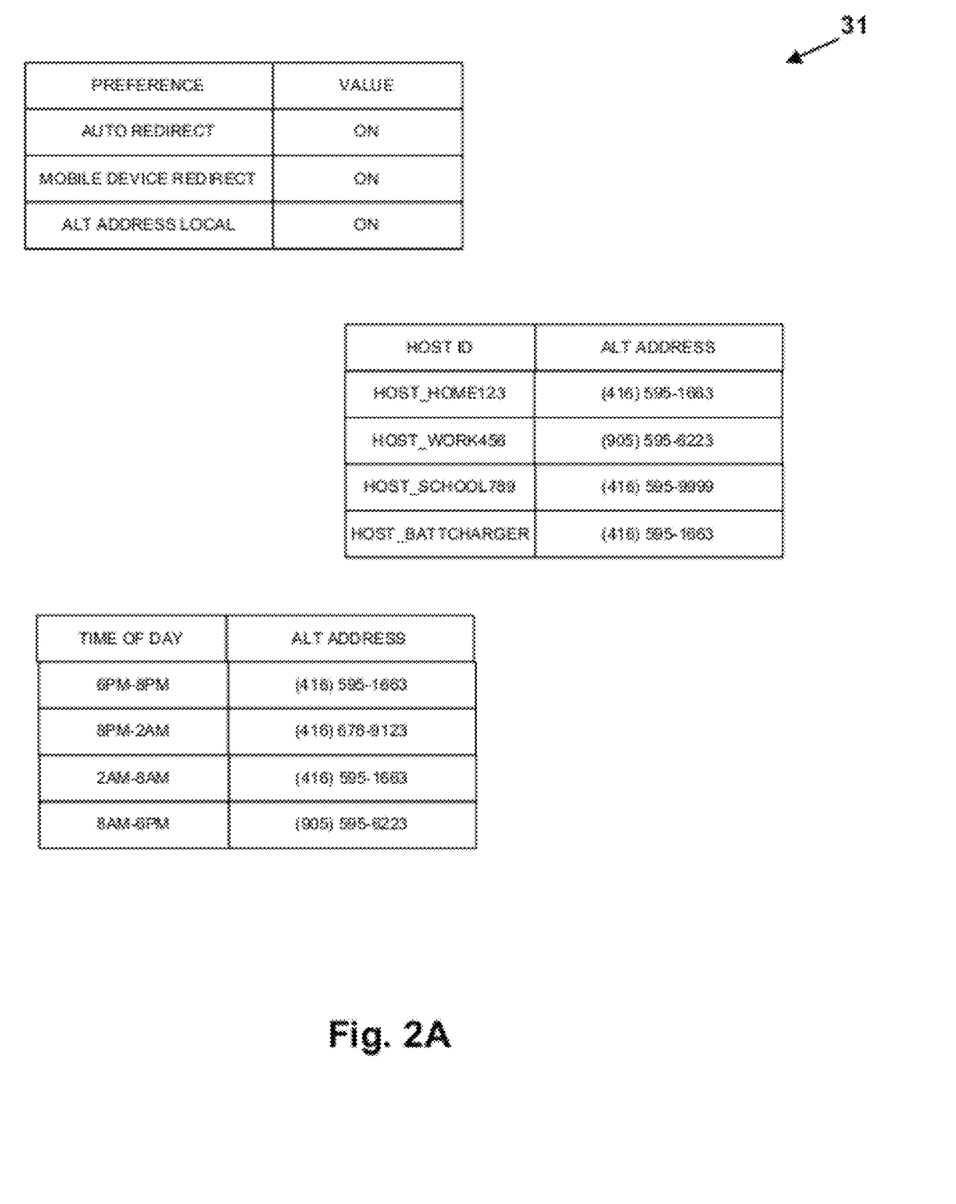
FIG. 2A shows exemplary tables in a database stored in memory of the mobile device of FIG. 2.

FIG. 2A shows tables in database 31 in memory 30 of mobile device 12. As can be seen, a number of preferences are available to a user to configure the behavior of mobile device 12 for initiating transmission of a call redirecting command. Such preferences include the option to turn auto call redirecting ON/OFF, the option to first have mobile device 12 transmit the call redirecting command (as opposed to host PC 22, for instance), and the option to obtain an alternate address for call forwarding locally (i.e. from database 31 of memory 30). Furthermore, other tables shown include preferences for associating addresses of alternate communications endpoints with different hosts (work computer, home computer etc.), and/or associating addresses of alternate communications endpoints with time of day such that the alternate communications address sent with a redirecting command (as described below) is based on the time of day the redirecting command is sent.

As would be understood by one of ordinary skill in the art, host PC 22 comprises an advanced USB interface for communication via advanced USB charging cable 20 with mobile device 12 and for providing a charging voltage via advanced USB charging cable 20 to mobile device 12. The USB interface on host PC 22 receives instructions from mobile device 12 to transmit a redirecting command to network operations centre 54 via its Ethernet network interface. The command sent by host PC 22 may be email or another such message.

Figure 3:
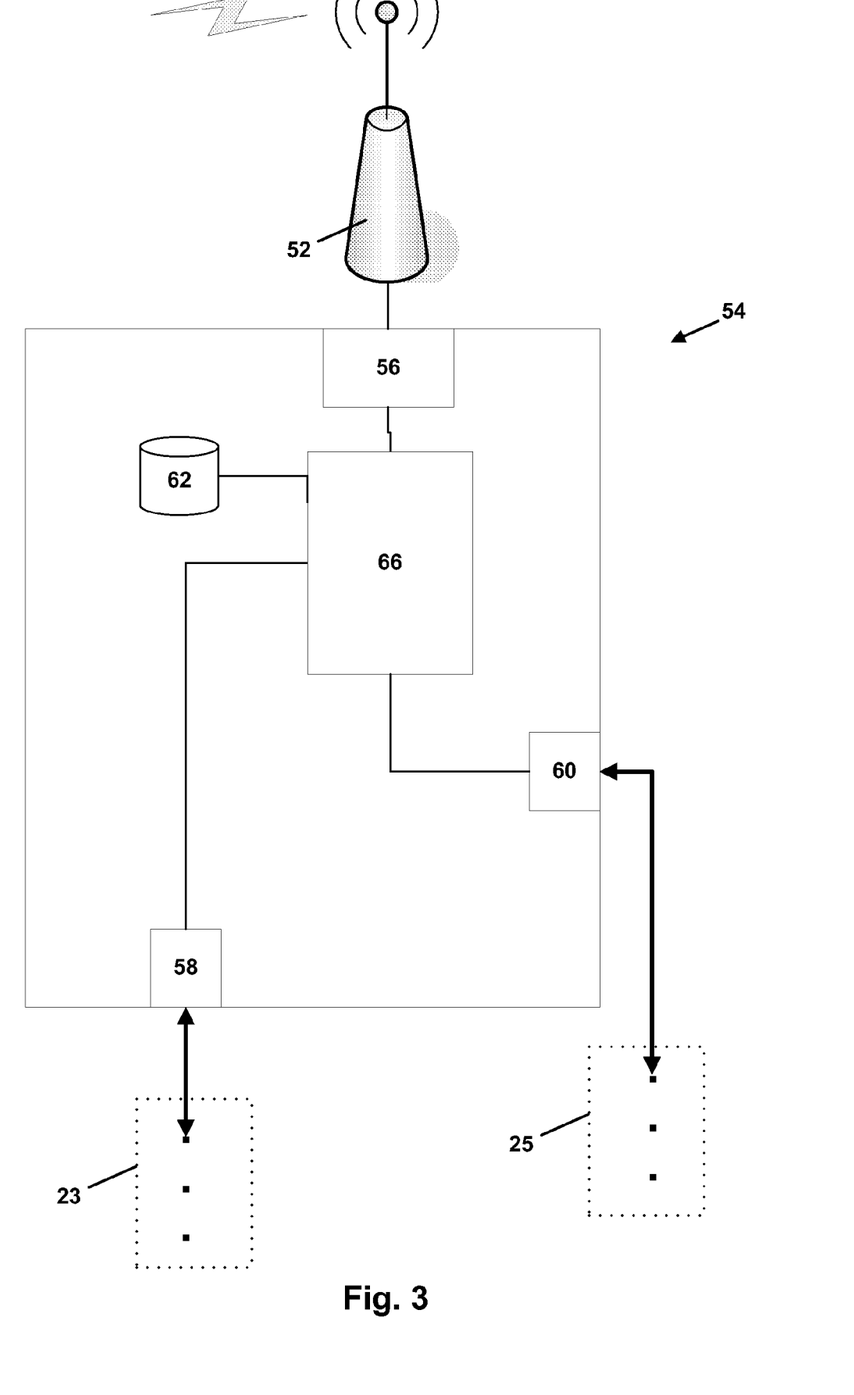
FIG. 3 is a block diagram showing the features of a switch in the network operations centre of FIG. 1 with which the host of FIG. 1 may communicate.

The components of network operations centre switch 54 for handling receipt of a redirecting command from either mobile device 12 or host PC 28 are shown in FIG. 3. Switch 54 includes a wireless transceiver 56 for transmitting and receiving data and/or voice to and from devices such as mobile device 12, via antenna 52. Switch 54 also includes an Ethernet interface 58 for handling communications on data network 23, and a telecommunications interface 60 for handling receipt and for directing calls between devices such as mobile device 12 and other devices on telephone network 25. Switch 54 further includes memory 62 for storing switch operation programs and data, a power supply (not shown), and a processor 66 for handling operation of switch 54. Processor 66 is connected to the other components of switch 54 via an internal data bus (only parts shown for illustration purposes), as would be understood by one of ordinary skill in the art.

Figure 3A:
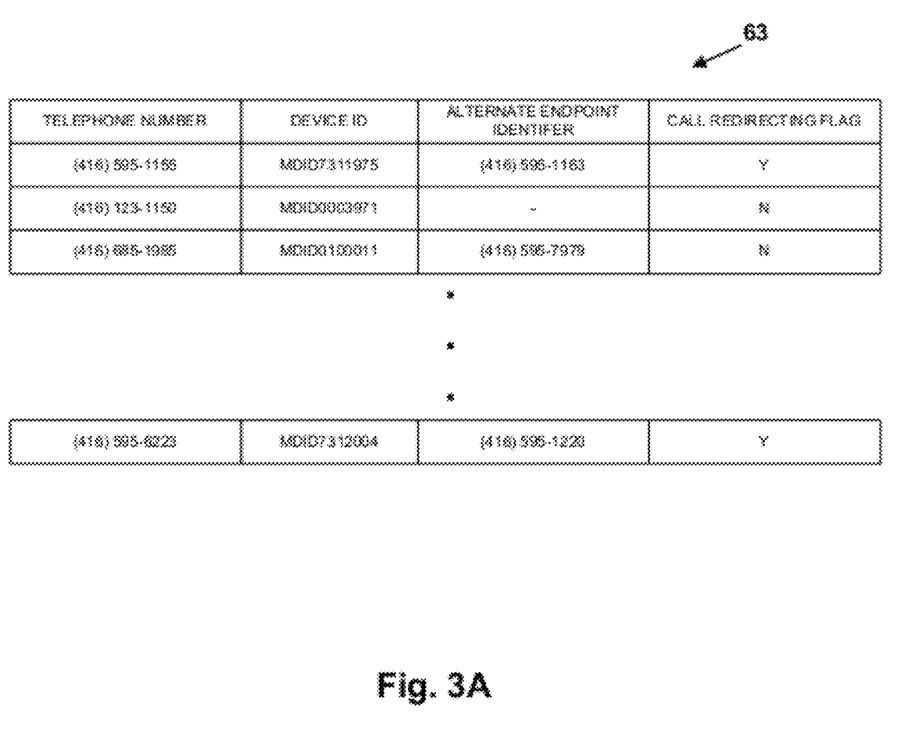
FIG. 3A shows an exemplary switch table in a database stored in memory of the switch of FIG. 3.

FIG. 3A shows a table in database 63 in memory 62 of network operations switch 54. As can be seen, a call request arriving at switch 54 identified by a telephone number can be associated with a mobile device ID and transmitted to the corresponding mobile device. Additional columns in the table include a call redirecting flag and an alternative endpoint identifier, as will be described in further detail below.

Mobile device 12 and network operations centre 50 exchange voice and/or data in any conventional manner during standard operations of communications system 10. For instance, when a user of mobile device 12 wishes to place an outgoing call, a call request including an identification of the desired endpoint is transmitted by mobile device 12 to network operations centre 50 for relaying to telephone network 25 for distribution to a call controller corresponding to the desired endpoint. When the outgoing call request is answered, the two devices are connected and communications between parties may proceed. In a similar manner, calls for mobile device 12 from other endpoints are relayed onto telephone network 25 to network operations centre 50. Switch 54 receives the identification of mobile device 12 in the incoming call, and directs the incoming call to mobile device 12.

The procedure for connecting calls received from, for instance, a TCP/IP telephone via data network 23 or through wireless transceiver 56, while each employing respective communications standards and protocols, is for the purposes of triggering call redirecting the same as those received from telephone network 25.

When an incoming call request is received by network operations centre 50 (whether, as mentioned above, the call request is received via wireless transceiver 56, data network 23 or telephone network 25), processor 66 is alerted. In response to receipt of the incoming call request, processor 66 (instructed by programs in memory) parses the incoming call request to extract the telephone number identifying mobile device 12. Using the telephone number as a key, processor 66 refers to a database 63 in memory to retrieve a hardware ID for mobile device 12, and has transceiver 56 send a ring instruction to mobile device 12. When the user of mobile device 12 answers the call, switch 54 connects the incoming call to mobile device 12.

The method of operation of system 10 for triggering call redirecting will be described below.

Figure 4:
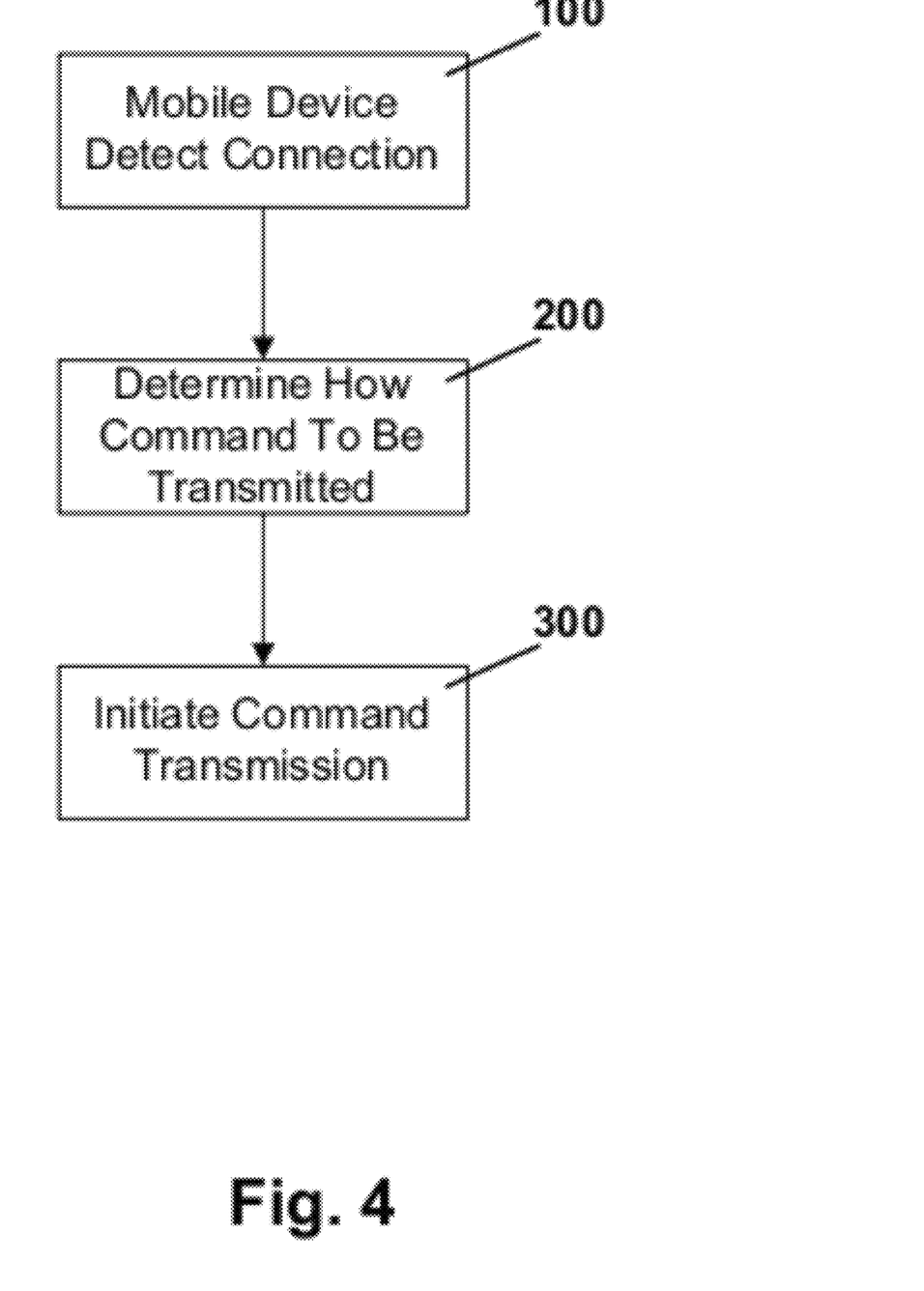
FIG. 4 is a flowchart showing the basic steps implemented by the mobile device of FIG. 2 for triggering call redirecting.

FIG. 4 is a flow chart showing the basic steps of the method for triggering redirecting of calls for mobile device 12. First, mobile device 12 detects a connection to host PC 22 (step 100). At this stage, mobile device 12 has become aware on its own that it has been connected to host PC. In response to the detection of the connection, mobile device 12 determines how calls should thereafter be forwarded (step 200). Once mobile device 12 has determined how calls should be forwarded, mobile device 12 initiates transmission of a command to network operations centre 50 to redirect calls for mobile device 12, in accordance with the determination.

In general, step 100 comprises, when mobile device 12 is connected to host PC 22 via advanced charging cable 20, USB interface 34 detecting the application of charging voltage and signaling processor 28 of the detection. USB interface 34 also retrieves a host PC ID from host PC 22.

Figure 5:
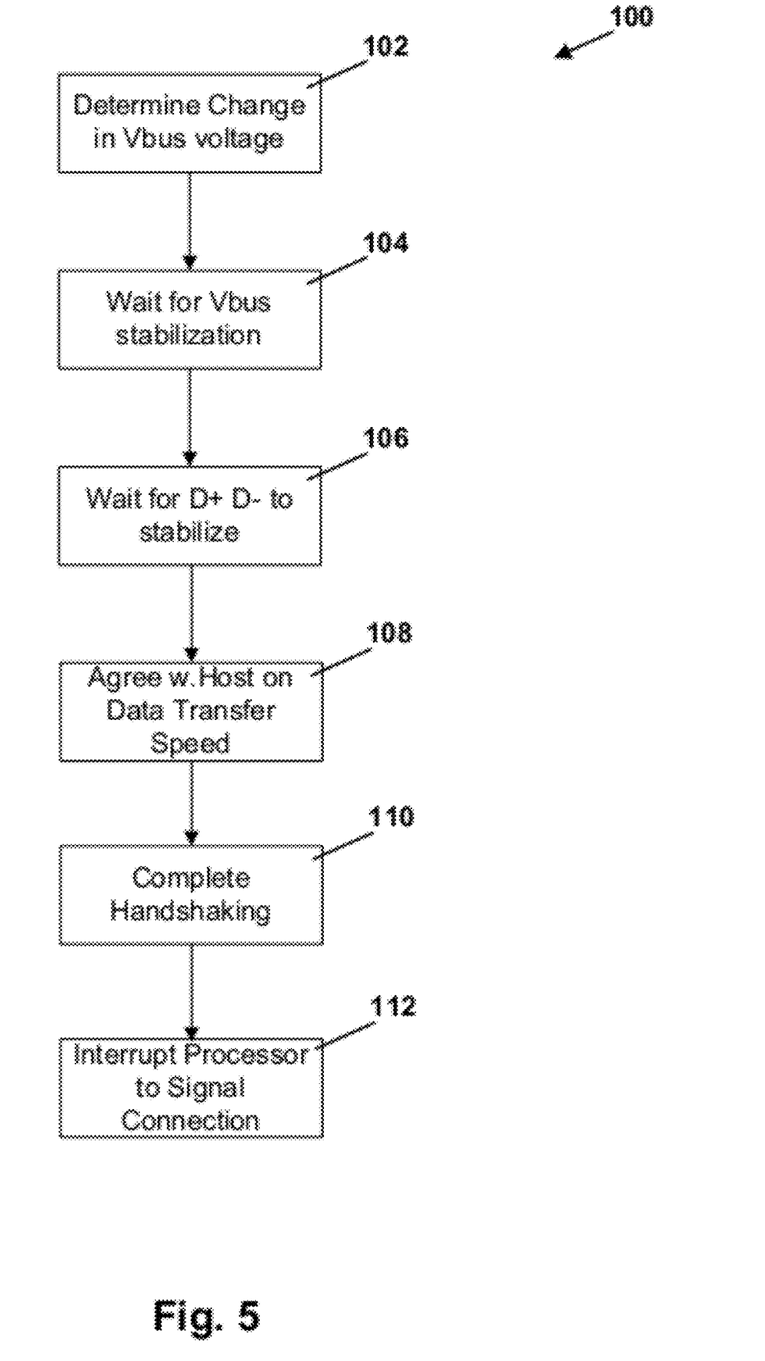
FIG. 5 is a flowchart showing in more detail the steps implemented by mobile device to detect a connection to a host.

FIG. 5 is a flowchart showing in more detail the steps implemented by mobile device 12 to detect a connection to host PC 22 (step 100). In particular, and available in further detail in the above-mentioned USB specification, upon connection of device 12 to host PC 22 via USB cable 20, a change in Vbus is detected by USB interface 34 (step 102). Timing delays are comprehended by USB interface 34 of the device to permit stabilization of the Vbus power (step 104). Once the Vbus power is permitted to stabilize, the data connection on D+ and D− is tested for stability (step 106) before software in host PC 22 attempts to reset or otherwise control the device, and transfer speeds are agreed-upon between host 22 and device 12 (step 108). Once handshaking has completed (step 110), host 22 and device 12 are ready to communicate data. Of particular importance to the present invention, however, is that once handshaking has completed, device 12 can confirm that it is validly connected to host 22 and may therefore make the decision to determine how calls should be forwarded (step 200). It does not have to wait for some kind of instruction through USB cable 20 from host PC 22 to do so. USB interface 34 invokes an interrupt or similar mechanism to inform processor 28 of the valid connection (step 112). In response, processor 28 invokes a program to handle call forwarding, as described below.

Figure 6:
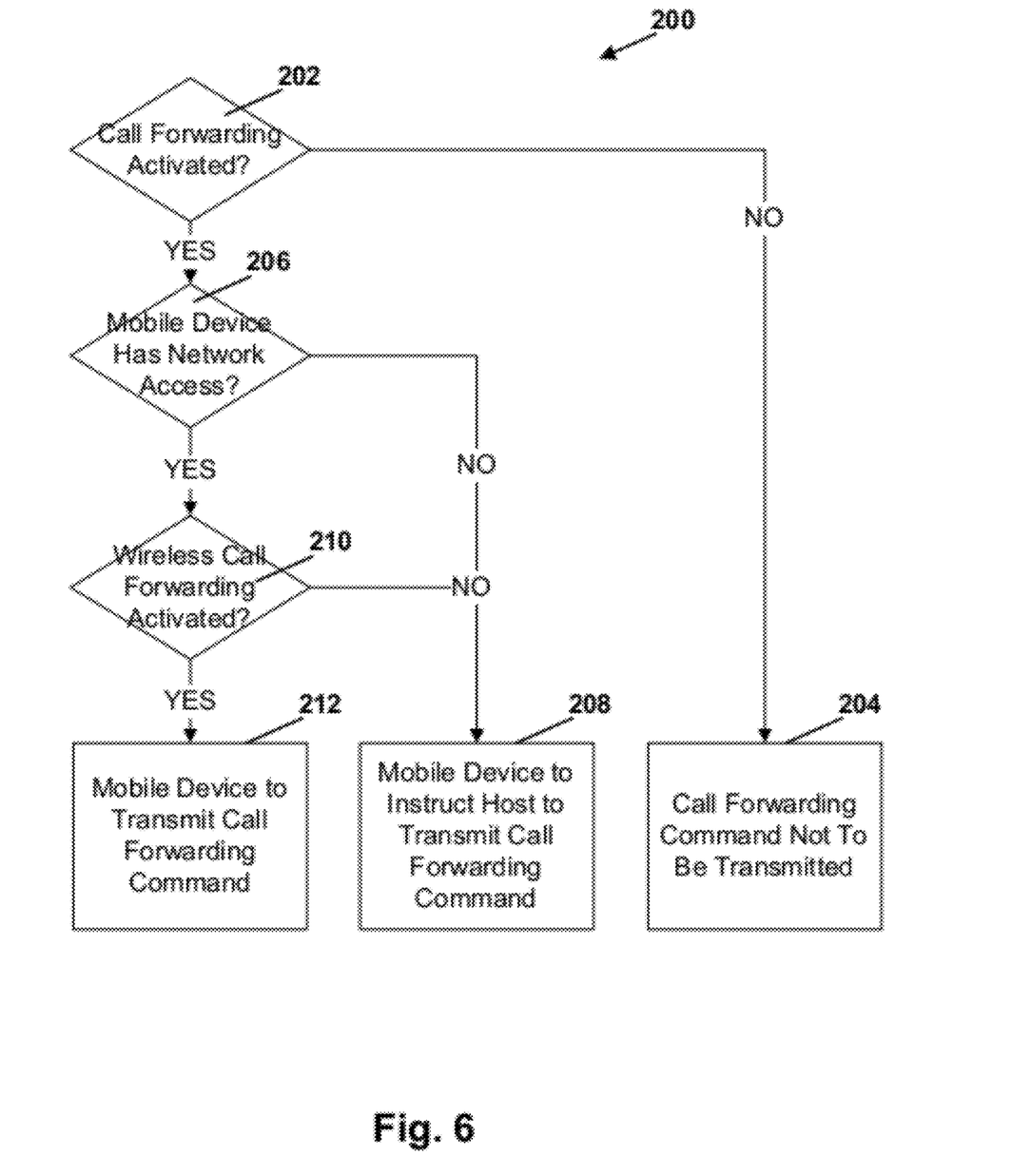
FIG. 6 is a flowchart showing in more detail the steps and decisions implemented by mobile device to determine how a call redirecting command is to be transmitted.

FIG. 6 is a flow chart showing in more detail how it is determined that calls should be forwarded (step 200) once the connection to host PC 22 has been established. Processor 28 of mobile device 12 refers to user preferences stored in a user preference area in memory 30 to determine whether calls should be forwarded upon connected to host PC 22 (step 202). If the user preferences indicate that no automatic call forwarding is to take place upon connection to host PC 22, then no call forwarding command needs to be sent (step 204). If the user preferences indicate that call forwarding is to take place upon connection to host PC 22, then processor 28 signals transceiver 26 to test whether mobile device 12 can wirelessly communicate with network operations centre 50 (step 206). If it is found by transceiver 26 that mobile device 12 cannot wirelessly communicate with network operations centre 50 (as would occur, for instance, if mobile device 12 was outside of its wireless network range), then processor 28 determines that call forwarding commands should be sent by host PC 22 (step 208) via network 23 to network operations centre 50. If it is found by transceiver that mobile device 12 is able to wirelessly communicate with network operations centre 50, then processor 28 determines from user preference tables in database 31 whether a user has set preferences to transmit call forwarding commands wirelessly (step 210). If so, mobile device 12 determines that call redirecting commands should be sent wirelessly by mobile device 12 to network operations centre 50 (step 212). If not, mobile device 12 determines that call redirecting commands should be sent by host PC 22 (step 208).

Once it is determined how calls should be forwarded (step 200), then mobile device 12 initiates transmission of a command to network operations centre 50 to redirect calls for mobile device 12 to an alternate communications endpoint (step 300). FIG. 6 shows step 300 in further detail.

As would be understood, network operations centre 50, when receiving a call forwarding command, must know to which alternate communications endpoint 24 calls for mobile device 12 should be redirected. To this end, the communications address of the desired alternate communications endpoint 24 in the form of a telephone number is stored in the database 63 in memory 62 of switch 54. The telephone number of the alternate communications endpoint 24 may be provided by mobile device 12 either automatically or at the user's request when sending a call redirecting command or host PC 22 when doing the same.

Figure 7:
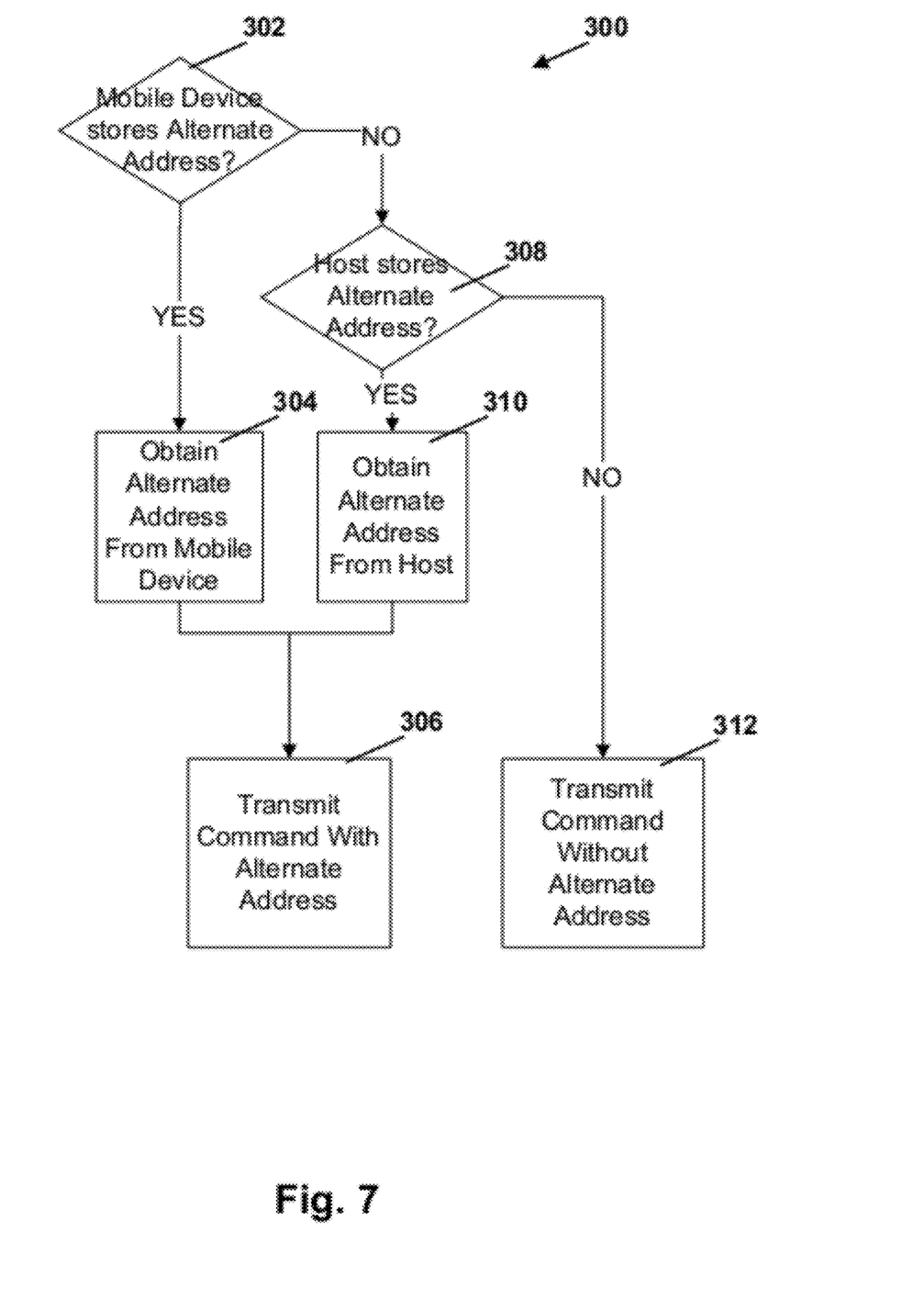
FIG. 7 is a flowchart showing in more detail the steps and decisions implemented by mobile device after determining how a call redirecting command is to be transmitted to initiate transmission of a call redirecting command.

With reference to FIG. 7, processor 28 of mobile device 12 first determines whether it has the alternate address in memory 30 for including with the command (step 302). This is determined by referencing memory 30 to find a record having host PC ID as the key. If memory 30 has the alternate address, then the alternate address is retrieved from memory 30 by processor 28 (step 304) and processor 28 can proceed to arrange for transmission of the command with the alternate address (step 306). If memory 30 does not have the alternate address, then processor 28 sends a request for the alternate address through USB interface 34 and USB cable 20 to host PC 22 (step 308). Host PC 22 sends a response including the alternate address (step 310) and processor 28 can proceed to arrange for transmission of the command with the alternate address (step 306).

Should host PC 22 not respond with the alternate address, then processor 28 of mobile device 12 proceeds under the assumption that network operations centre switch 54 has the alternate address in its memory (step 312).

Figure 7A:
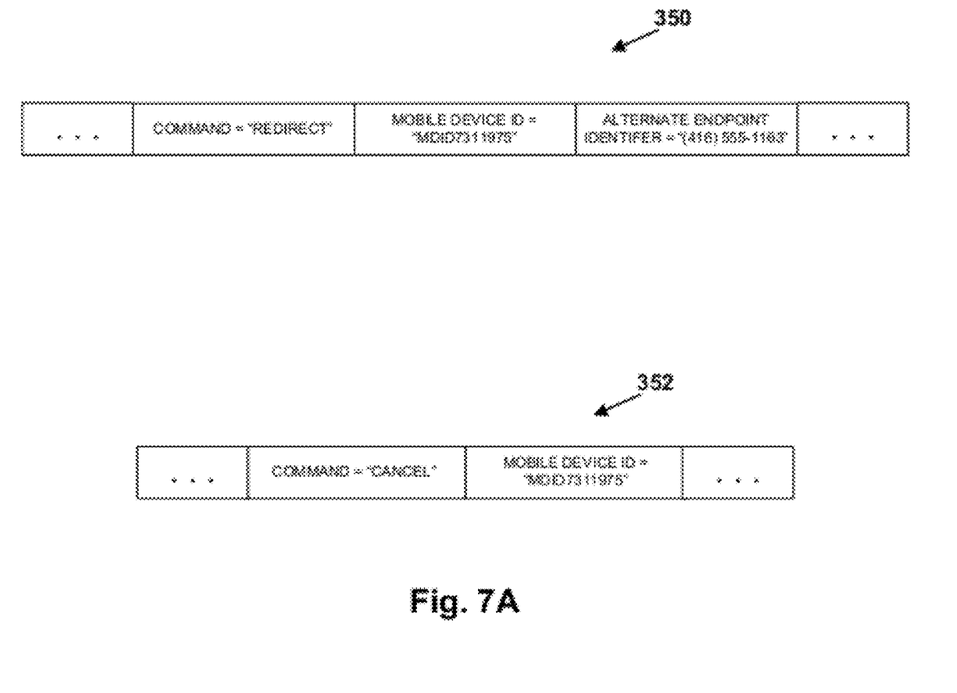
FIG. 7A shows an exemplary call redirecting command sent from mobile device or host to network operations centre switch, and an exemplary call redirecting cancel command.

FIG. 7A shows an exemplary call redirecting command 350 for sending from mobile device 12 or host PC 22 to network operations centre switch 54.

If, during the determining (step 200), processor 28 had established that mobile device 12 is to transmit the command, processor 28 retrieves the command from memory 30. Processor 28 then inserts the alternate communications address (if obtained in step 300) into the command and instructs transceiver 26 to transmit the command to network operations centre 50 using antenna 27.

If, during the determining (step 200), processor 28 had established that host PC 22 is to send the command, processor 28 retrieves the command from memory 30. Processor 28 inserts the alternate communications address (if obtained in step 300) and sends an instruction including the command through USB interface 34 and USB cable 20 to host PC 22 for host PC 22 to transmit the command. Upon receipt of the instruction, host PC 22 transmits the command through data network 23 to network operations centre switch 54. It will be understood that, as needed, host PC 22 may repackage the command into a suitable format, such as e-mail, prior to its transmission.

FIG. 7A shows exemplary call redirecting commands sent by either host PC 22 or mobile device 12 to network operations centre switch 54. As can be seen, the call redirecting commands contain the "REDIRECT" command, an identification of the mobile device (in this case, its hardware ID), and optionally an alternate endpoint identifier. The call redirecting command may contain error management data as would be understood by one of ordinary skill in the art for reducing the chance of misinterpretation by network operations centre switch due to corruption during transmission. An exemplary call redirecting cancel command is also shown containing the "CANCEL REDIRECT" command and an identification of the mobile device. It will be understood that these commands are shown in concept only, and may be transmitting in one of many forms, such as embedded in a wireless data packet, an email or other carrier suitable to the channel and the device.

Figure 8:
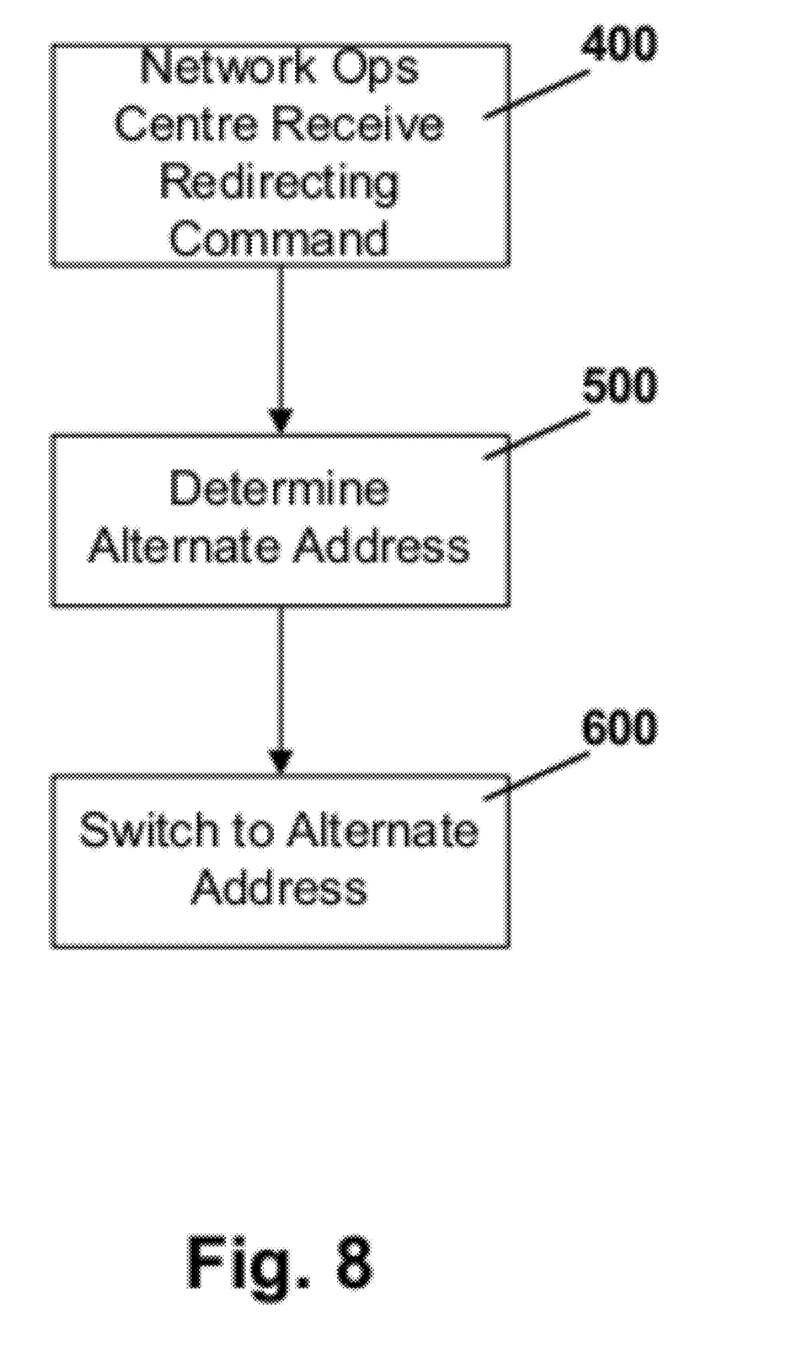
FIG. 8 is a flowchart showing the basic steps implemented by the network operations centre switch of FIG. 3 for receiving a call directing command and effecting call redirecting.

FIG. 8 is a flow chart showing the general steps acted out by network operations centre switch 54 in order to handle the call redirecting command. Upon receipt of the call redirecting command (step 400), switch 54 determines the alternate communications endpoint 24 (step 500) and then makes arrangements so that incoming calls for mobile device 12 are switched to the alternate communications endpoint 24.

Receipt of a call redirecting command (step 400) comprises wireless transceiver 56 of switch 54 providing processor 66 with the received command. Processor 66 proceeds to determine in respect of which device switch 54 handles the command has been sent, and the alternate address to which calls are to be redirected (step 500).

Figure 9:
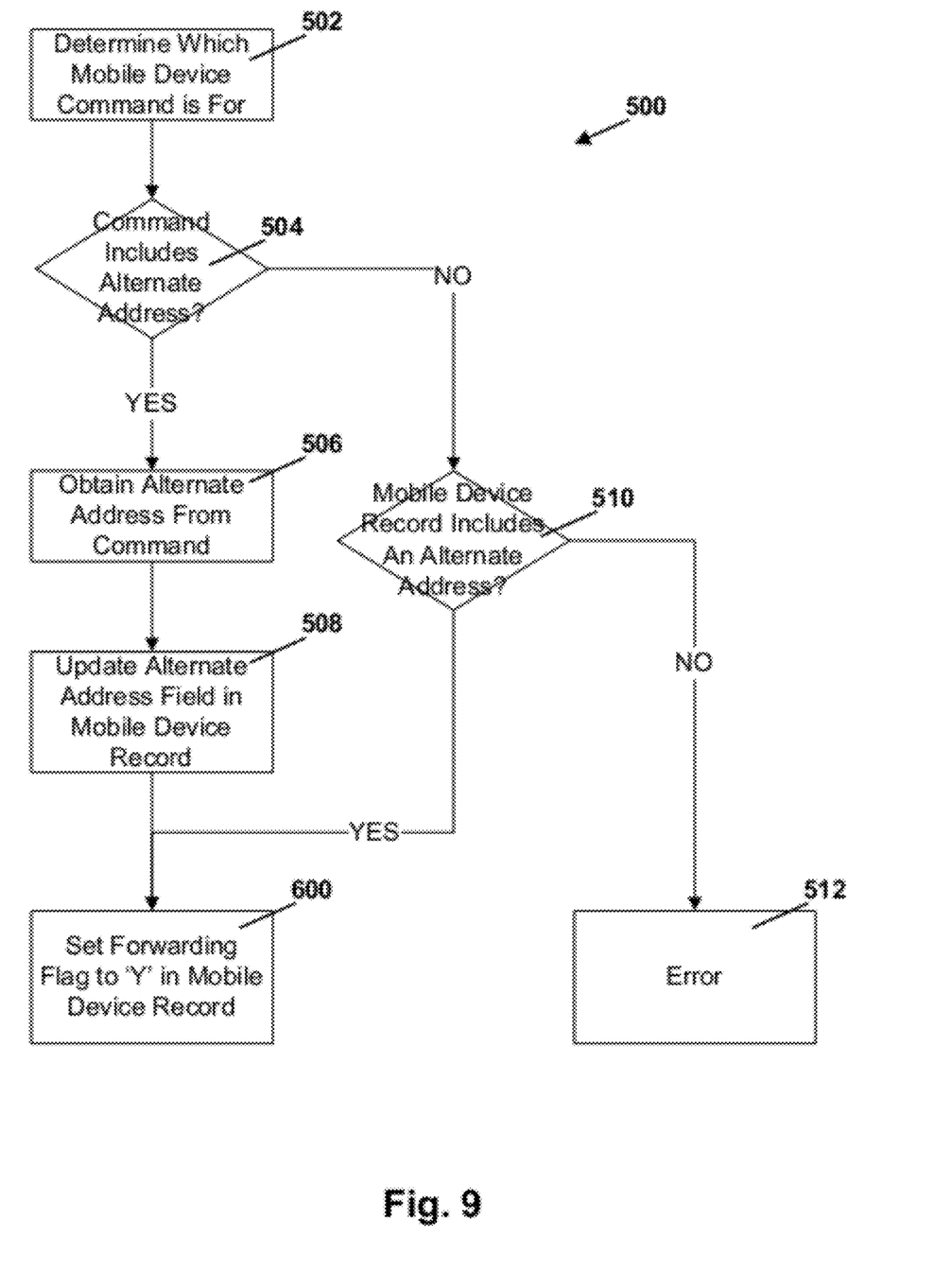
FIG. 9 is a flowchart showing in more detail the steps implemented by network operations centre switch for determining an address of the alternate communications endpoint upon receiving a call redirecting command.

FIG. 9 is a flowchart showing in more detail the steps involved in determining the alternate address (step 500). First, processor 66 of switch 54 parses the command to determine which device the command is for (step 502). If the alternate address is contained in the command (step 504), then processor 66 obtains the alternate address from the command (step 506) and updates the alternate address field in the database 63 in memory 62 (step 508). If the alternate address is not contained in the command, then processor 66 looks up the record corresponding to mobile device 12 in memory 62 to determine whether an alternate address has already been specified (step 520). If at this stage the alternate address is not in the record of mobile device 12 in memory 62, then an error is declared (step 512) because a call forwarding command has been issued but no alternate address is available. Errors are handled in any suitable manner, as would be known by one of ordinary skill in the art. For instance, a message may be sent back to mobile device 12 indicating that call forwarding cannot proceed or. Alternatively, simply no action may be taken.

If the alternate address is available, then processor 66 sets the redirecting flag in the record corresponding to mobile device 12 to 'Y' (step 600). That is, to forward calls to alternate communications endpoint 24. Any subsequent calls for mobile device 12 will be treated by switch 54 as calls for alternative communications endpoint 24. Such subsequent calls are redirected through telecommunications interface 60 to alternate communications endpoint 24. As would be understood, the channel through which calls are redirected (whether through telecommunications interface 60, Ethernet interface 58 or wireless transceiver 56) depends on which alternate communications endpoint 24 is specified by the alternate address.

If conditions on mobile device 12 change, such as for instance mobile device 12 determines from periodic testing that it is able to connect wirelessly to network operations centre 50, transmission of another command may be initiated by mobile device 12 to either cancel call redirecting or to change the alternate communications endpoint to which calls are redirected. Such changed conditions may include disconnection of mobile device 12 from host PC 22, a specific request of a user, a user preference keyed to time of day, etc.

Figure 10:
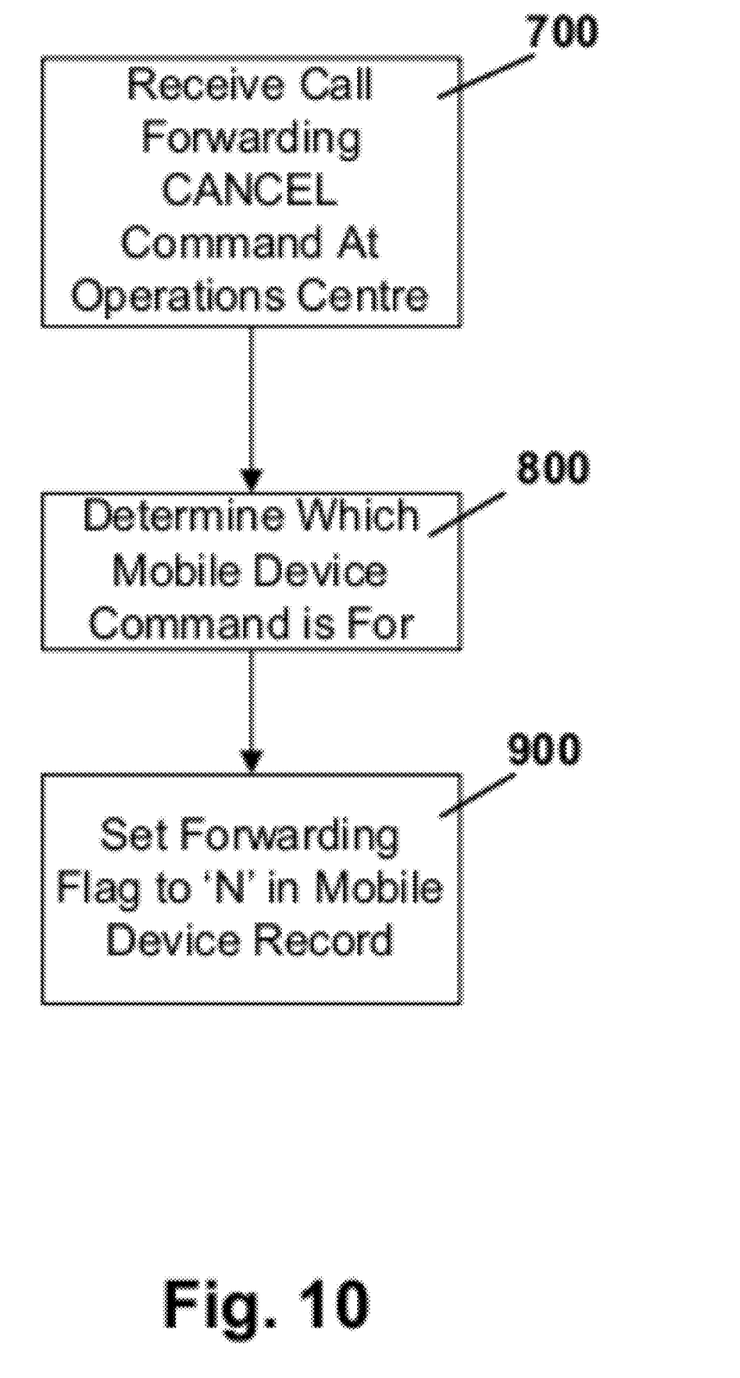
FIG. 10 is a flowchart showing the steps implemented by network operations centre switch for canceling call redirecting upon receipt of a cancel command.

FIG. 10 is a flowchart showing the general steps taken by network operations centre 50 to cancel call redirecting in response to a "Cancel" command. It will be understood that a "Cancel" command is very similar in form to a redirect command.

Referring to FIG. 10, processor 66 of network operations centre switch 54 first receives a "Cancel" call redirecting command (step 700). As with the redirecting command process (see FIG. 8), processor 66 proceeds to determine that the command has been sent in respect of mobile device 12 (step 800). At this stage, processor refers to database 63 in memory 62 and alters the record for mobile device 12 in database 63 by setting the redirecting field to 'N' (step 900). That is, call redirecting for mobile device 12 is de-activated.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact operation illustrated and described, and accordingly all suitable modifications and equivalents may be resorted to, falling within the purpose and scope of the invention.

For example, a host could be a number of different devices, as long as the mobile device is able to detect its connection to the host such that initiating transmission of the redirecting command has a meaningful effect. That is, the nature of the connection must be that which enables the mobile device to know it has been connected to a valid host and therefore the necessity of initiating transmission of a redirecting command. As such, the host could be a personal computer (as described above), a battery charger, a standalone cradle for car or home, or any other suitable device.

While a USB connection has been described, it will be understood that the methods and systems described herein are applicable to other types of connections. For instance, Bluetooth™ short-range wireless transmission could be used by a mobile device to connect to a host device. When a mobile device is carried into a room having the host, for instance, the mobile device and host would be within Bluetooth transmission range and therefore mobile device could initiate transmission of the call redirecting command on that basis. Other connections might be contemplated, such as infrared, serial data, parallel data, regular power etc. Also, on a very basic level, a connection could be signaled by closure of a physical switch on the mobile device when physically coming into contact with a host cradle, for instance.

It is also conceivable that, where the host is instructed to transmit the command, that the command could be transmitted using alternate wireless means by the host, or the host further instruct another component to which it is connected to send the command on its behalf.

Many permutations and combinations of the ideas embodied above can be contemplated. For instance, the database 31 on the mobile device may include a number of alternate communications addresses associated with respective host IDs. As such, the mobile device could be connected to any one of a number of hosts, and initiate transmission of a redirecting command for redirecting to associated respective alternate communications endpoints.

Furthermore, communications for the endpoint could be phone calls and signals, emails, chat communications, etc. The alternate communications endpoint could be a standard telephone, an IP telephone, another mobile device, a cell phone, a computer connected to the Internet, a server for storing emails for access by users, or any other device that is capable of being referred to or of storing communications using a unique communications endpoint identifier such as an IP address, email address etc.

The methods and systems of the present invention may be implemented at least partly in software. The software would be in the form of a computer readable medium containing processor-executable code thereon for performing the disclosed steps. In the mobile device, for instance, detection of the USB +5V charging voltage by a circuit could trigger loading and/or operation of a software program from non-volatile memory for handling determining whether the voltage has stabilized, confirm the connection by handling successful handshaking, and trigger call redirecting or fully handle it.

What is claimed is:

1. A method of triggering redirecting of communications for a mobile device, the method comprising:
   said mobile device detecting connection of said mobile device to a host;
   in response to determining that said mobile device is unable to connect wirelessly to the network operations centre, said mobile device causing said host to automatically transmit a first command to the network operations centre to redirect calls for said mobile device to an alternate communications endpoint;
   said mobile device conducting periodic testing to determine whether the mobile device is able to communicate wirelessly with the network operations centre and, in the event that the mobile device is able to communicate wirelessly with the network operations centre, said mobile device wirelessly transmitting a second command to the network operations centre to redirect calls to said mobile device.

2. The method of claim 1, further comprising:
   prior to the host transmitting the first command, retrieving an identification of said alternate communications endpoint; and
   including said identification in said first command.

3. The method of claim 2, wherein said identification is retrieved from memory on said mobile device using a host identifier.

4. The method of claim 1, wherein said connection is an advanced Universal Serial Bus (USB) connection and said detecting connection comprises detecting a predetermined charging voltage level applied by said host through said USB connection.

5. The method of claim 1, wherein said connection is an advanced Universal Serial Bus (USB) connection and said detecting connection comprises receipt by said mobile device through said connection of a host identifier.

6. The method of claim 1, wherein said connection is a short-range wireless connection.

7. The method of claim 6, wherein said connection is one of a Bluetooth and an infrared (IR) connection.

8. The method of claim 1, wherein said detecting connection comprises detecting closing of a physical switch, said physical switch closing when said mobile device and said host are connected.

9. A system within a mobile device for triggering redirection of communications for the mobile device, said system comprising:
   a detector detecting connection of said mobile device to a host;
   a processor causing the host to automatically transmit a first command to a network operations centre to redirect communications for said mobile device to an alternate communications endpoint in the event that the mobile device is unable to communicate wirelessly with the network operations centre;
   a transceiver periodically testing to determine whether the mobile device is able to communicate wirelessly with the network operations centre;
   wherein in the event that the mobile device is able to communicate wirelessly with the network operations centre, the processor causes the transceiver to transmit a second command to the network operations centre to redirect calls to said mobile device.

10. The system of claim 9, further comprising memory for storing an identification of said alternate communications endpoint, wherein said first command includes said identification.

11. The system of claim 9, wherein said connection is an advanced Universal Serial Bus (USB) connection and said detector is a charging voltage level detector for detecting a predetermined charging voltage level applied by said host through said USB connection.

12. The system of claim 9, wherein said connection is a short-range wireless connection and said detector is a short-range wireless connection detector.

13. The system of claim 12, wherein said connection is one of a RF and an infrared (IR) connection.

14. The system of claim 9, wherein said detector is a circuit having a physical switch that closes when said mobile device and said host are connected.

15. A non-transitory computer-readable medium having stored thereon computer-readable instructions for performing a method of triggering redirecting of communications for a mobile device, the computer-readable instructions including instructions for performing operations comprising:
   said mobile device detecting connection of said mobile device to a host;
   in response to determining that said mobile device is unable to connect wirelessly to the network operations centre, said mobile device causing said host to automatically transmit a first command to the network operations centre to redirect calls for said mobile device to an alternate communications endpoint;
   said mobile device conducting periodic testing to determine whether the mobile device is able to communicate wirelessly with the network operations centre and, in the event that the mobile device is able to communicate wirelessly with the network operations centre, said mobile device wirelessly transmitting a second command to the network operations centre to redirect calls to said mobile device.

16. The non-transitory computer-readable medium of claim 15, wherein said computer-readable instructions further comprise instructions for:
   prior to the host transmitting the first command, retrieving an identification of said alternate communications endpoint; and
   including said identification in said first command.

17. The non-transitory computer-readable medium of claim 15, wherein said connection is an advanced Universal Serial Bus (USB) connection and said detecting connection comprises detecting a predetermined charging voltage level applied by said host through said USB connection.

18. The non-transitory computer-readable medium of claim 15, wherein said connection is an advanced Universal Serial Bus (USB) connection and said detecting connection comprises receipt by said mobile device through said connection of a host identifier.

19. The non-transitory computer-readable medium of claim 15, wherein said connection is a short-range wireless connection.

20. The non-transitory computer-readable medium of claim 19, wherein said connection is one of a Bluetooth and an infrared (IR) connection.

* * * * *